Feb. 25, 1969 A. B. LOVINS 3,430,128
METHOD AND MEANS FOR OBSERVING NUCLEAR MAGNETIC RESONANCES
Filed March 26, 1965 Sheet 1 of 4
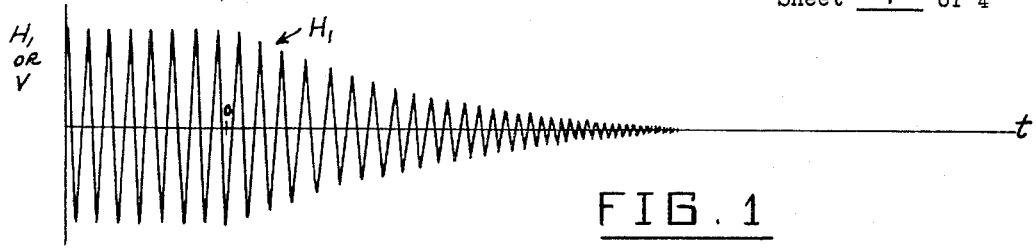
FIG. 1
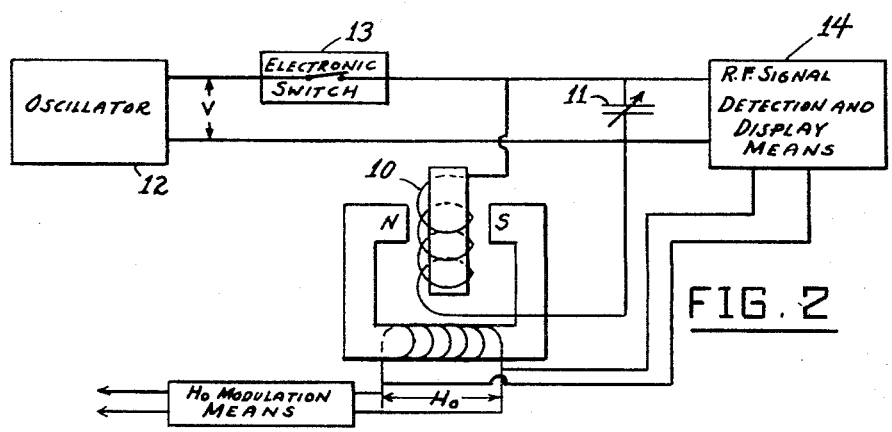
FIG. 2
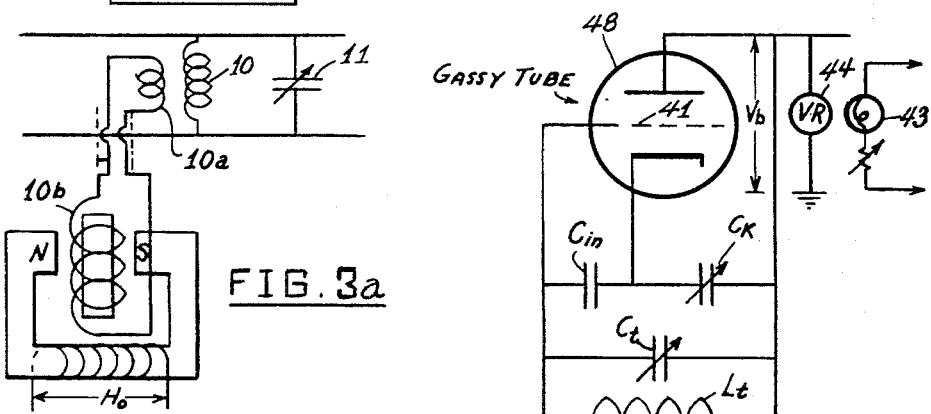
FIG. 3a
FIG. 4
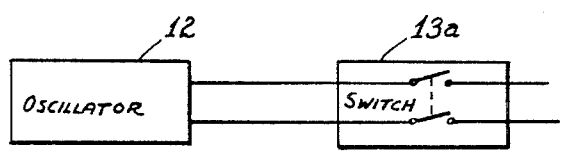
FIG. 3b
INVENTOR
AMORY B. LOVINS
BY Herman L Gordon
ATTORNEY INVENTOR
AMORY B. LOVINS
BY /Herman L Gordon
ATTORNEY Feb. 25, 1969 A. B. LOVINS 3,430,128
METHOD AND MEANS FOR OBSERVING NUCLEAR MAGNETIC RESONANCES
Filed March 26, 1965 Sheet 3 of 4

INVENTOR
AMORY B. LOVINS

BY Herman 2 Gordon

ATTORNEY

United States Patent Office 3,430,128
Patented Feb. 25, 1969

3,430,128
METHOD AND MEANS FOR OBSERVING
NUCLEAR MAGNETIC RESONANCES
Amory B. Lovins, Mill Lane, Amherst, Mass. 01002
Filed Mar. 26, 1965, Ser. No. 442,901
U.S. Cl. 324—.5                                    24 Claims
Int. Cl. G01r 33/08

ABSTRACT OF THE DISCLOSURE

A method and means for observing NMR absorptions with very high sensitivity and over a wide range of R-F field amplitudes. Its principle is to detect absorptions from an exciting field that is not in steady-state oscillation but in a prolonged decay; in this way the exciting field, and hence $1/T_1$ for usable samples, may be made arbitrarily small by exciting and detecting absorptions arbitrarily late in the decay. In a typical embodiment, the ringing oscillation occurs in a resonant circuit Q-multiplied by insertion in an autodyne marginal oscillator, and the usable portion of the decay lasts for tens or hundreds of $\mu$sec. Many variations on and refinements of this arrangement are described, including methods of adjusting the apparatus by using the interaction between the tuning and gain controls; use of a high-gain, low-noise oscillator tube whose mode of operation changes during the ringing from that of a conventional pentode to that of a cold-cathode gas triode; means for optimizing the performance of practical oscillators; and means for displaying and measuring the absorptions.

---

This invention relates to nuclear magnetic resonance (NMR) spectrometry, and is more particularly concerned with improved circuitry and techniques for the observation and measurement of very minute absorptions of energy from a radio-frequency alternating magnetic field by atomic nuclei undergoing induced transitions between various spin states, when the spin-lattice relaxation time of the nuclear spin system is very long. The usefulness of this invention will be better understood if certain aspects of NMR theory and practice are first reviewed.

The energy of a nucleus in a magnetic field $\tilde{H}_0$ is a function of the orientation of the nuclear magnetic moment in $\tilde{H}_0$; for nuclei with intrinsic spin $I=\frac{1}{2}$, for example (the only case considered here), the magnitude of this moment in any direction has exactly two observable values, corresponding to spin quantum numbers $$m=+\tfrac{1}{2},-\tfrac{1}{2}$$

and to energies $$<\alpha|\mathcal{H}|\alpha>$$

and $$<\beta|\mathcal{H}|\beta>$$

(in Dirac notation), where $\alpha,\beta$ are normalized orthogonal wave functions describing the two ($=2I+1$) discrete spin states produced. The Hamiltonian $\mathcal{H}$ is of the form $jhH_0m$ (where $j$ is a unique constant characteristic of each nuclear species), and yields energies of $\pm j\hbar H_0/2$.

Transitions between the spin states may thus be induced by irradiation with photons of frequency $$\nu_{\text{res.}}=H_0 j/2\pi=H_0 j$$

Those transitions are allowed which are between states with symmetric wave functions and which have $|\Delta m|=1$. Since the populations of the spin states obey a Boltzmann distribution, excitation by photons of the proper frequency induces slightly more raising than lowering transitions, and hence a minute net absorption of energy—an absorption due, according to the classical model, to resonance of a rotating magnetic field $\tilde{H}_1$ with the nuclear moments precessing gyroscopically in $\tilde{H}_0$. The absorption may also be attributed to $\chi''$, the imaginary part of the susceptibility of the sample.

An excited state of the nuclear spin system corresponds to a heating of the system relative to the surrounding lattice, and, following the laws of thermodynamics, decays exponentially to the Boltzmann equilibrium distribution. This decay process is characterized by a half-life, known as the spin-lattice relaxation time and written $T_1$, that is a property of each sample, and that is normally of the order of $10^{-5}$ to $5\times 10^5$ second. Relaxation times in the liquid state are usually short, since energy can be transferred in intermolecular collisions as rotational or translational momentum, but are normally longer in solids, since (unless quadrupolar mechanisms come into play) energy transfer must be by direct coupling or spin diffusion to paramagnetic centers in the lattice.

In practice, nuclear resonances are excited at radio frequencies ($\nu_{\text{osc.}}=1$ to 100 mc./sec.) by an oscillating magnetic field $\tilde{H}_1$ produced by a coil which contains the sample and which is in turn contained within the airgap of an electromagnet producing a static field of intensity $H_0=1$ to 20 kg. (kilogauss). The sample coil is so disposed within the magnet airgap that $\tilde{H}_1$ is perpendicular to $\tilde{H}_0$. Resonances are observed by amplifying and displaying (1) the detected signal induced in a second coil perpendicular to both the sample-coil axis and $\tilde{H}_0$ (the invention of Bloch); or (2) the output of an R.F. bridge unbalanced by the resonance (an arrangement due to Rollin and others); or (3) the detected output of a marginal oscillator with the sample coil in or coupled to the parallel resonant circuit. In all three methods, $H_0$, usually varied while $\nu_{\text{osc.}}$, the oscillator frequency, is held constant, is modulated by an audio-frequency component of the order of a milligauss to one gauss; readout is by an oscilloscope or by a phase detector and graphic recorder.

The first two circuit arrangements mentioned are becoming less frequently used because of numerous practical disadvantages, including extreme microphonism, difficulty in tracking, high drift rate, and presentation of a nuclear absorption signal adulterated by the associated nuclear dispersion signal. Even the marginal oscillator, although a simple and versatile arrangement, is not entirely satisfactory, especially in the following respects:

(1) If $H_1$ is too large for a given sample (and the longer $T_1$ is, the smaller must be $H_1$) the amplitude of the absorption decreases drastically because of saturation of the nuclear spin states: energy is being added to the spin system more rapidly than it can be dissipated through the available relaxation mechanisms, and $\chi''$ is reduced. It is very difficult to obtain a stable marginal-oscillator tank voltage of less than several millivolts, and it is nearly impossible to obtain stable tank voltages of less than about 20 microvolts. In some solid-state samples, the field amplitude $H_1$ produced in the sample coil by a voltage of this magnitude is sufficient to reduce the signal amplitude by several orders of magnitude, and a momentarily larger field will saturate the spin system so completely that one must wait for many hours before the signal is again detectable. The best two-coil systems also produce excessively large radio-frequency fields (down to about 15 microgauss [the magnitude of a rotating field vector, not a peak-to-peak amplitude]). One frequently suspects that transitions giving rise to interesting fine structure in a NMR spectrum are being so saturated by an excessively high power level in the marginal oscillator that the structure cannot be detected; and when one attempts to observe lines weakened by partial saturation, one finds that (2) the marginal oscillator as it has heretofore been arranged is not sufficiently sensitive to detect very weak nuclear resonances. The most sensitive NMR systems currently available employ two-coil or bridge arrangements, and can detect (without time-averaging computation) the resonance of a sample of about $2 \times 10^{-15}$ protons. Most marginal oscillators have at best half this sensitivity.

(3) Moreover, if one's marginal oscillator is designed to produce very small values of $H_1$, one usually cannot perform experiments requiring the production of very large values of $H_1$ (several gauss); and normally cannot rapidly and continuously adjust the instrument from a stable high-power to a stable low-power state with the reproductivity required for some solid-state measurements (e.g., direct measurement of $T_1$).

In summary, presently available marginal oscillators do not provide sufficient sensitivity for the observation of very weak lines (signals equivalent to, say, the line from $5 \times 10^{14}$ protons); do not provide sufficiently low values of $H_1$ to avoid saturation of subtle solid-state transitions; and, even if (as is seldom the case) they can obtain radio-frequency fields of several gauss, cannot maintain their stability in rapid changes of power level, and cannot be rapidly adjusted from an $H_1$ value of, say, 100 milligauss to one of 20 microgauss with sufficient reproducibility for accurate calibration. The first two of these defects are shared by the other types of NMR spectrometers.

One object of this invention is to provide a method and means for observing nuclear magnetic resonances, whereby all three of the above disadvantages are materially reduced or even eliminated.

Another object of the invention is to provide certain refinements of circuitry to optimize the performance of these means.

Another object of the invention is to provide means for recording continuously or intermittently sampled signals obtained with these means.

A further object of the invention is to provide means for controlling and triggering these recording means so that the recording intervals exactly coincide with the intervals in which signals are present.

A still further object of the invention is to provide means for stabilizing the magnitude of the magnetic field $H_0$ by locking $H_0$ to the frequency of the marginal oscillator.

In presently employed marginal-oscillator circuits, the radio-frequency resonant voltage in a parallel resonant tuned circuit (in the coil in which the sample is contained) is amplified, and a limited portion of the amplifier output (limited by the amplifier itself, or, as in Robinson's arrangements, by a separate device) is fed back into the resonant circuit to maintain oscillation.

In the present invention, the functions of amplification and limiting are either not present or present in small degree; the oscillation in the resonant circuit is not a continuously maintained oscillation, but a prolonged ringing which, once it has decayed, can be reinitiated only by resetting the circuit.

In order that the above and other objects and features of this invention may be more thoroughly understood, embodiments of the invention will now be described in some detail, with reference to the accompanying drawings, wherein:

FIGURE 1 is a graphical diagram of $H_1$ (or of V, the voltage across the sample coil) versus time in an idealized form of this invention;

FIGURE 2 is a block diagram of one form of apparatus according to the present invention;

FIGURES 3a and 3b are fragmentary circuit diagrams illustrating possible modifications of the embodiment of FIGURE 2;

FIGURE 4 is a simplified schematic diagram of another embodiment of the present invention;

Figure 14:
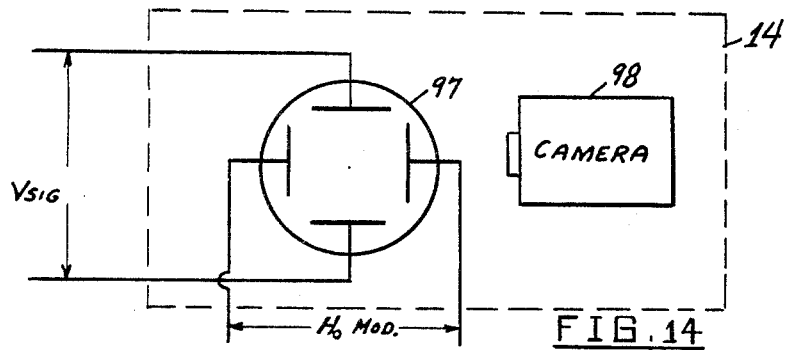
Figure 14A:
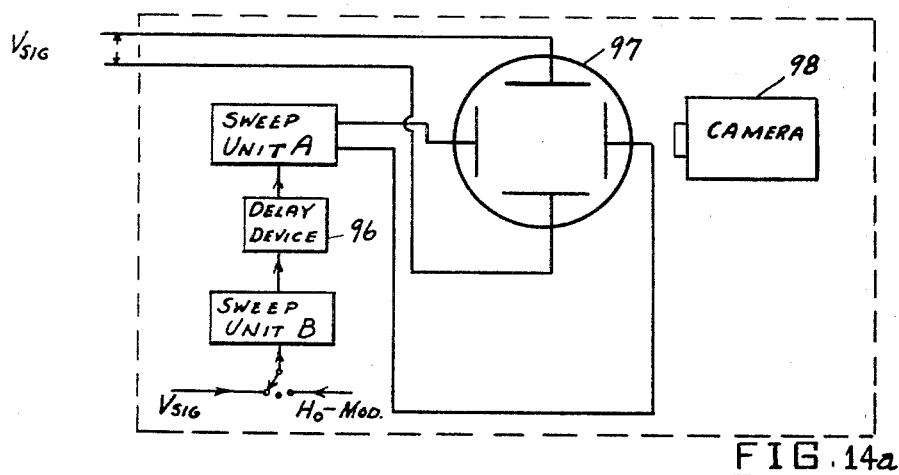
Figure 14B:
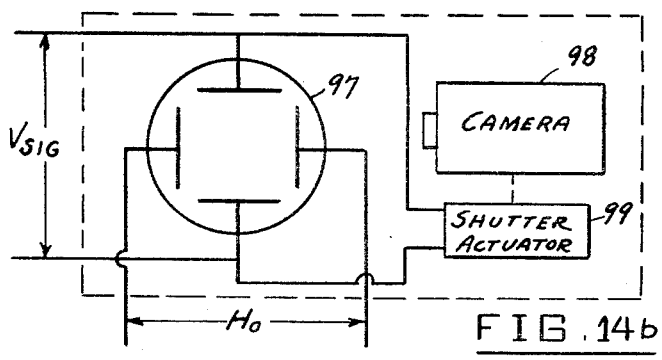

FIGURES 14, 14a, and 14b are block diagrams showing various recording means employing an oscilloscope, suitable for use in the present invention.

Reference is first made to FIGURE 2 of the accompanying drawings, which shows one basic embodiment of the present invention in block-diagrammatic form. In this arrangement a coil 10 containing the nuclear resonance sample and placed in the field $\tilde{H}_0$ from a powerful magnet is shunted by a capacitance 11, so that a parallel resonant circuit resonant at a radio frequency $\nu_{\text{osc.}}$ is formed. This tuned circuit is driven by an oscillator 12 which produces a periodic waveform at or nearly at the resonant frequency of the tuned circuit. A mechanical or (preferably) electronic switch, of any of the numerous types familiar to those skilled in the art, is inserted into one connection joining the oscillator to the tuned circuit so that the waveform being supplied to the latter can be rapidly and cleanly interrupted. Also connected across the resonant circuit are means 14 for detecting, amplifying, and displaying the radio-frequency signal across the coil 10. In such an arrangement, operation of the oscillator 12 with the switch 13 closed will excite a radio-frequency oscillation of contact amplitude in the resonant circuit.

A sudden opening of the switch 13 will produce an exponentially decaying ringing in the tuned circuit; the voltage V(t) across the coil 10 at time $t$ will be given by $$V(t) = V(0) e^{-Rt/2L} \cos(2\pi \nu_{\text{osc.}} t)$$

wherein R is the resistance (at frequency $\nu_{\text{osc.}}$) of the coil 10 and all associated wiring, and L is the inductance of the coil 10 and all associated wiring. V(0) is the steady-state R.F. voltage, and can be adjusted to an arbitrary value by inserting an amplifier or attenuator in the output circuit of the oscillator 12. It is evident that the higher the quality factor ($Q = 2\pi \nu_{\text{osc.}} L/R$) of the coil 10 (as well as of the rest of the resonant circuit), the more prolonged will be the decay of the oscillation in the resonant circuit; and that in such an arrangement, the use of a relatively high inductance and a relatively low capacitance in the resonant circuit, although not productive of a high degree of frequency stability, will also prolong the ringing. The effective Q of the tuned circuit may be increased by increasing the input impedance of the detection/amplification/readout means 14.

There are two major applications of this arrangement to the detection of nuclear resonances. Firstly, when dealing with certain types of samples with very short $T_1$, one frequently wishes to know the effect upon absorption amplitude and lineshape of various values of $H_1$. Absorption amplitude can be quickly and easily measured for $H_1$ varying continuously from hundreds of gauss down to a few nanogauss (nanogauss=$10^{-9}$ gauss) by allowing the voltage V in the resonant circuit (tuned to the nuclear resonance frequency $\nu_{res.}$ corresponding to the given value of $H_0$) to decay exponentially with the sample in place inside the coil 10, and comparing the decaying envelope of the oscillating voltage V measured by the detecting and displaying means 14 with that obtained with no sample but with the same values of $\nu_{osc.}$ and V(0).

Secondly, as was pointed out previously, it is important in working with samples with very long $T_1$ to avoid saturation by excessively strong radio-frequency fields. If one employs the arrangement of FIGURE 2, adjusted so that the resonant frequency $\nu_{osc.}$ of the tuned circuit is not the same as the nuclear resonant frequency $\nu_{res.}$ of the sample nuclei for whatever value of $H_0$ is present, the energy of the photons supplied to the nuclei will not be of the proper value for the excitation of transistions, and saturation will not occur for any value of $H_1$. Now, by opening the switch 13 as previously described, one obtains an exponentially decaying radio-frequency oscillation (represented by FIGURE 1), the amplitude of which, if one waits long enough, will be small enough so that the oscillating magnetic field produced in the coil 10 will be so small as not to saturate a resonance in any sample whatever. In other words, the voltage V across the coil 10 decreases steadily with time after the opening of switch 13, and, after a certain time has elapsed, is as small as one may desire.

Figure 6:
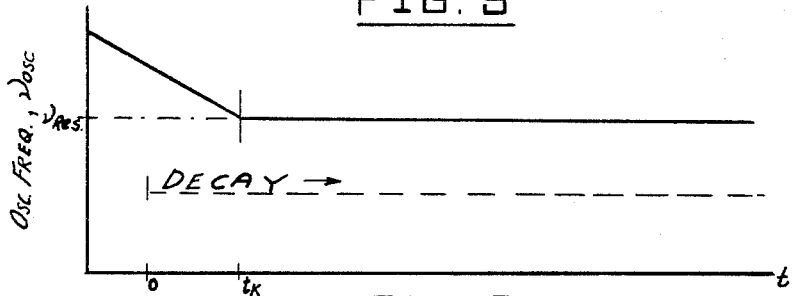
FIGURES 6 to 8 are graphical diagrams illustrating various methods of use of the apparatus of FIGURES 2, 4, and 5.
Figure 7:
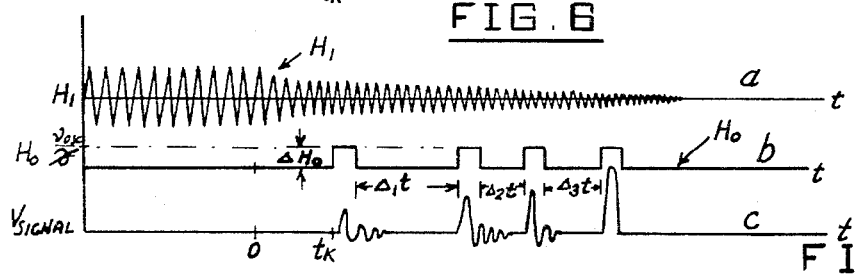
Figure 8:
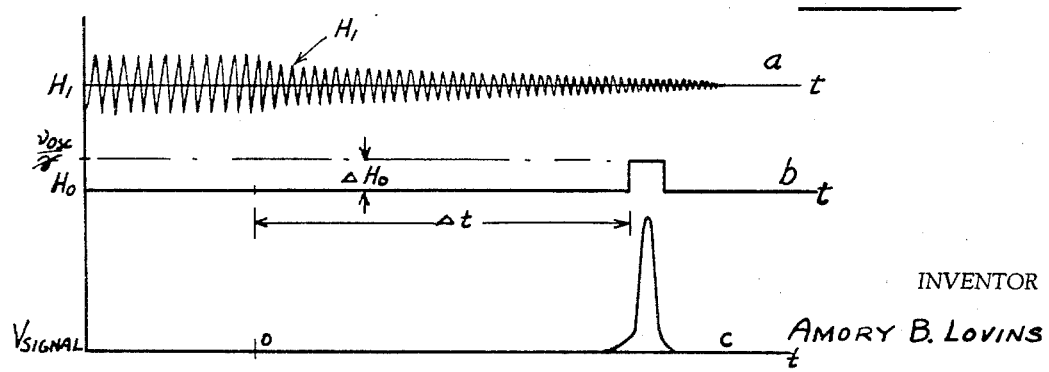

In order to take advantage of the arbitrarily small values of $H_1$ that may be obtained by this technique, one must be able to change $\nu_{osc.}$ or $\nu_{res.}$, or both, during the decay of $H_1$. The results of so doing are illustrated in FIGURES 6, 7, and 8. With reference first to FIGURE 6, one may start with the resonant circuit tuned to a frequency $\nu_{osc.}$ which is not equal to the nuclear resonant frequency $\nu_{res.}$, and one may, for example, by adjusting the capacitance 11, increase or decrease $\nu_{osc.}$ during the decay period until $\nu_{osc.}=\nu_{res.}$. The variation of the capacitance 11 may be accomplished manually or by servo-mechanical adjustment, or by the use of a voltage-variable capacitor. A variable inductor in series with the coil 10 might also be adjusted mechanically or electronically. With reference next to FIGURE 7, one may hold $\nu_{osc.}$ constant and vary $\nu_{res.}=\mathfrak{z} H_0$ during the decay period by modulating $H_0$ with an audio-frequency component, as shown in trace b. One may employ, for example, a sinusoidal or square-wave modulation that "samples" the resonance at intervals $\Delta_i t$ (starting at the time $t_k$) by adjusting $H_0$ briefly to the proper value $\nu_{osc.}/\mathfrak{z}$ for resonance and then returning $H_0$ to a "holdoff" condition $H_0=(\nu_{osc.}/\mathfrak{z})-\Delta H_0$. (Of course, $t_k$ must be long enough to avoid saturation.) One may then observe the effect upon absorption amplitude and line-shape of various values of $H_1$ as previously described, but in a discontinuous manner, obtaining a signal represented in FIGURE 7c. Next, with reference to FIGURE 8, if one wishes to observe a resonance in a sample with an unknown but very long $T_1$, one may avoid the danger of saturation by the following procedure: adjust $H_0$ as shown in FIGURE 8, trace b, to a "holdoff" value $\Delta H_0$ from the resonant condition, locating the latter by employing a sample with the same $\mathfrak{z}$ (i.e., the same nuclear species) but with a conveniently short $T_1$; initiate the decay in the resonant circuit tuned to $\nu_{res.}$; after a long interval $\Delta t$ (perhaps 0.5 sec.), "sample" the resonance by modulating $H_0$ into resonance by a pulse of height $\Delta H_0$ as shown at trace b in FIGURE 8; repeat the decay and "sampling," gradually decreasing $\Delta t$ until characteristic minor changes in line-shape warn one that a further decrease will result in saturation. The signal obtained is represented in trace c of FIGURE 8. With these two techniques, namely, of varying $\nu_{osc.}$ and $\nu_{res.}$ during the decay period, one may observe any resonance without saturation, and at whatever power level below the saturation point may be desired. One may obtain further versatility by varying both $\nu_{osc.}$ and $\nu_{res.}$ during the decay.

Reference is made now to FIGURES 3a and 3b, which represent two modifications of the embodiment of FIGURE 2. FIGURE 3a shows a scheme whereby the coil 10 in the parallel resonant circuit previously described does not itself contain the nuclear resonant sample, but is inductively coupled to an untuned secondary winding 10a which in turn is connected (through a rigid or flexible coaxial cable) to an untuned sample coil 10b. This arrangement, if the coupling of coil 10 to its secondary winding 10a is relatively loose, permits the use of a flexible cable of considerable length without excessive deterioration of frequency stability. FIGURE 3b represents a circuit wherein the switch 13a interrupts both connections to the resonant circuit (rather than one only as shown in FIGURE 2), an arrangement which may reduce switching transients. Many other modifications of the basic embodiment shown in FIGURE 2 are clearly possible without departing from the spirit of the invention.

It is clearly advantageous to observe a single "sampled" resonance during a time interval sufficiently short so that the flux $H_1$ does not decay appreciably during the observation. There are practical limitations as to how short this "sampling" interval may be, however, since excessively rapid "sampling" of a resonance gives rise to spurious "ringing" effects. It is therefore desirable to prolong the decay as much as possible, i.e., to reduce $R/2L$ as far as possible, so that in a given sampling interval, the value of $H_1$ will be as nearly constant as possible. The amount of time occupied in the decay of V to $10^{-4}$V(0) is of the order of 100 microseconds for the highest-L and highest-Q resonant circuits practically obtainable at room temperature. (It is frequently impractical to reduce the temperature to increase Q.) It will be found in practice that such a rapid decay, although not excessively quick for some applications, is unsuitable for others, and that many solid-state investigations require a decay a hundred to a thousand times slower. Certain refinements which prolong the ringing to this extent will now be described. These embodiments involve the incorporation of the ringing tuned circuit into a marginal-oscillator circuit similar to the type known in the art as the "autodyne" circuit.

In order to explain certain salient features of this variable-frequency marginal oscillator, reference is made to the simplified schematic diagram shown in FIGURE 4. A radio-frequency amplifier tube 48 (with at least one grid 41) is connected as shown to a parallel resonant circuit with inductance $L_t$ (plus associated wiring) and capacitance $C_t$ (plus associated wiring, $C_{in.}$ and $C_k$). (All wiring shown, with the exception of that associated with the components 43 and 44, is for radio-frequency signals only; direct currents are blocked.) The output voltage of the amplifier tube 48 is placed across a capacitive voltage divider consisting of $C_k$ and $C_{in.}$, both shunted by $C_t$; $C_k$, a variable capacitance of many pf. (pf.=picofarad=$10^{-12}$ farad), supplies a load into which the tube can work, and $C_{in.}$, a fixed or nearly fixed capacitance of several pf. (consisting of wiring capacitance and the input capacitance of the tube 48), places a certain proportion of the total voltage drop across the divider back onto the grid 41 to maintain oscillation. Although some autodyne circuits described in the past have employed a variable resistance in place of $C_k$, it will be seen that the use of a variable capacitance, in addition to yielding lower noise levels, introduces certain useful interactions between the tuning control $C_t$ and the regeneration (oscillation-level) control $C_k$.

The marginal-oscillator circuit of FIGURE 4 normally operates as follows: for a certain proportion of $C_{in.}$ to $C_k$, the amplifier tube 48 whose gain $$\mu = \frac{|V_b - V_{\text{drop across divider}}| - V_{\text{anode-to-cathode at Q-point}}}{V_{\text{grid-to-cathode}}}$$

has a sufficient load to work into, and therefore a sufficient gain; and the voltage drop across $C_{in.}$ places enough feedback on the grid 41 to maintain a strong (hard-driven) oscillation of frequency $$\nu_{\text{osc.}} = (4\pi^2 C_{\text{total}} L_{\text{total}})^{-\frac{1}{2}}$$

If $C_k$ is then increased, either manually or electronically, its reactance decreases; the voltage drop across it (for it constitutes most of the tube load) decreases; the tube gain decreases. If $C_k$ be made large enough, oscillation will fall off to a very low level, or will even stop. ($C_k$ might also be decreased in order to place proportionally less voltage on the grid and thus achieve marginality, but it is difficult to make $C_k$ sufficiently small relative to $C_{in.}$.) It is of the highest importance to remember throughout the following discussion that a change in $C_k$ changes $\nu_{\text{osc.}}$ slightly, and that a change in $C_t$ changes V (the voltage across $L_t$) slightly.

Figure 9:
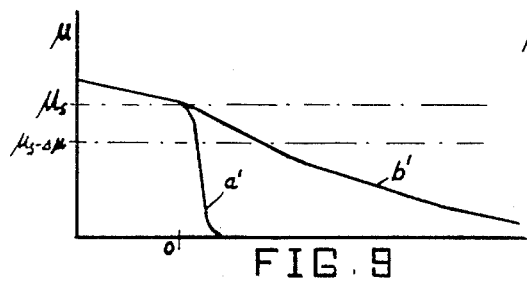
FIGURE 9 is a graphical diagram illustrating the change of tube gain with time in an idealized form of the present invention according to FIGURES 4 and 5, upon the introduction of a certain refinement into the circuit.

Assume that $C_k$ has just been increased (e.g., by manual adjustment, by driving a voltage-variable capacitor, or by some other method familiar to one skilled in the art) to such a value that the gain $\mu$ of the tube 48 just counteracts the losses in the rest of the circuit; a delicate balance then exists between gain and loss, and the oscillation is very marginal. Now let this balance be disturbed by a decrease in tube gain caused, for example, by a manually or electronically effected increase in $C_k$ or $C_t$, or by a decrease in the potential $V_b$ applied to the anode of the tube. (This potential, if obtained from an electronically regulated power supply, may be adjusted most minutely by changing the current through a lamp 43 in close proximity to at least one of the gas-filled voltage-regulator tubes 44 in the supply, and thus changing the ionization potential of the gas in the tube or tubes 44.) The amplifier tube gain $\mu$ can no longer quite counteract the circuit losses, and the oscillation decays as previously described, except more slowly, for the circuit losses represented by R in the expression $R/2L$ in the decay equation are reduced considerably by the tube gain remaining. The ringing in the resonant circuit has thus been prolonged, as was desired; but it can be prolonged still further, with a concomitant improvement in sensitivity, by introducing the following refinement:

Once V has decayed to a certain level, the gain of the amplifier tube tends to drop off rather sharply. If a normal sharp- or remote-cutoff tube is employed, conductance will decrease during the decay period until losses in the resonant circuit are not balanced, but enhanced and augmented, and until absorptions of energy from $L_t$ by the sample are no longer passed by the tube 48 with sufficient amplification. It is therefore desirable to utilize a slightly gassy tube, namely, one which contains sufficient gas to increase its transconductance by a factor of about 0.2, but not to increase its noise level significantly. The cutoff of the tube is now no longer sharp, as shown in trace $a'$ in FIGURE 9, for the deionization time of the gas ions is long enough to permit a more gradual decay of tube gain (as in trace $b'$ in FIGURE 9). The tube gain $\mu$, which at time $t=0$ is below the value $\mu_s$ required for the maintenance of stable oscillation, now decays (usually exponentially) through the value $\mu_s - \Delta\mu$ below which oscillation decay will be very rapid, and lingers long enough between these two values (or at least sets the mean gain $$\bar{\mu} = 0.01 \int_0^{100 \, \mu\text{sec.}} \mu(t) dt$$

between these two limits) to prolong the oscillation decay over about 100 $\mu$sec., i.e., long enough for nearly any experimental requirements.

During this decay period, the grid potential provides an efficient barrier to direct cathode-to-anode transmission of electrons; the anode effectively "sees" only the grid, and cannot "see" the cathode and all its thermionic noise. Conduction is primarily by the gas ions, an agency here not productive of the high noise levels encountered in certain other applications of gassy tubes. The effect is to make the grid the cathode of a new triode within the tube, and to block off the old hot cathode as if it were no longer functioning. The grid of this new triode is the old suppressor grid (the tube is in this case a triode-connected pentode as in FIGURE 5), which is connected to old hot cathode (no longer functioning). Thus the gas atoms, originally ionized by bombardment with energetic electrons from the hot cathode, remain ionized in the high potentials between control and screen grids, screen and suppressor grids, and suppressor grid and plate; changing grid potential cuts off the tube, eliminating noise from the hot cathode; conduction from control grid to plate continues via the gas ions; the cathode, now cold (the old control grid) is relatively noise-free; the gain, with the old suppressor grid now the control grid, is considerable; and the result is an efficient and relatively noise-free amplifier. One may thus operate at lower power levels than are really necessary (below the optimal half-saturating value of $H_1$, the signal amplitude falls off rapidly), since as $H_1$ decreases, the noise level also decreases, yielding a constant or increasing signal-to-noise ratio as $H_1$ decreases. Using the embodiment of FIGURE 5 (to be discussed below), one may in this way detect absorptions corresponding to a power of $5 \times 10^{-16}$ watt.

Figure 5:
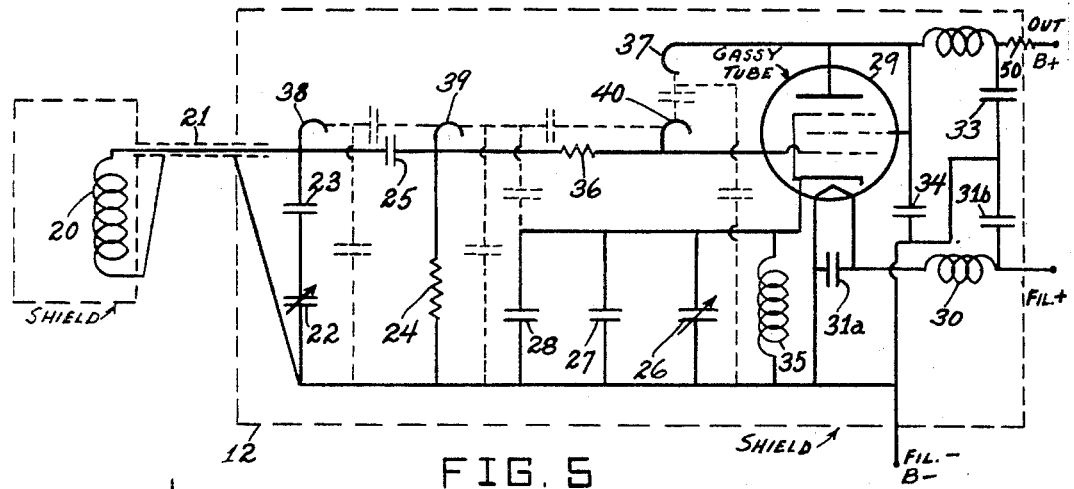
FIGURE 5 is a detailed schematic diagram of the arrangement shown in FIGURE 4.

As in the embodiment represented in FIGURE 2, it is important in the embodiment of the invention represented in FIGURES 4 and 5 to have some means of adjusting $\nu_{\text{osc.}}$, or $\nu_{\text{res.}}$, or both, during the decay of V. One may vary $\nu_{\text{res.}}$ as previously described (and as represented by FIGURES 7 and 8); $\nu_{\text{osc.}}$ may be easily varied (manually, servomechanically, or electronically) with $C_t$ or $C_k$. For example, one may use a sample with the same $j$ as the experimental sample (but with a much shorter $T_1$) to determine the frequency at which resonance will occur for whatever value of $H_0$ is being employed; increase $\nu_{\text{osc.}}$ from $\nu_{\text{res.}}$ by decreasing $C_t$; replace this test sample with the experimental sample; adjust the oscillator to marginality by increasing $C_k$; increase $C_t$ nearly to $\nu_{\text{res.}}$ until the oscillation begins to decay; continue to increase $C_t$ until $\nu_{\text{res.}}$ is reached at the desired time during the decay. $H_1(t)$ is then represented by FIG. 1, and the value of $H_1$ at resonance is thus determined by $dC_t/dt$.

Another typical application of the interaction between $C_k$ and $C_t$ involves the measurement of $T_1$ by the so-called "direct" (saturation) technique. One may set $C_t$ once and for all at an arbitrary point; using a test sample with very short $T_1$, place the oscillator in a highly marginal steady-state condition by increasing $C_k$; set a zero-beat in a receiver between the radio-frequency signal in the tuned circuit of the oscillator and a signal supplied by a stable radio-frequency source; replace the test sample with the experimental sample; decrease $C_k$ to increase $H_1$ and saturate the sample; when saturation is complete, quickly increase $C_k$ to regain the marginal condition in which the relaxing spin system is not being significantly perturbed, the previously set marginal point being obtainable (without overshooting it and passing into the decaying mode) with great rapidity and accuracy by returning to the preset zero-beat, since if $C_t$ is held constant the oscillator frequency is dependent upon the oscillation level. $T_1$ may then be determined from the rate of signal regrowth.

It will be found in practice that if $\nu_{osc.}(C_k, C_t)$ and $V(C_k, C_t)$ describe the frequency and tank voltage respectively of the oscillator, the functions $\partial \nu_{osc.}/\partial C_k$ and $\partial V/\partial C_t$ are usually complicated and seldom monotonic, although locally linear, while $\partial \nu_{osc.}/\partial C_t$ and $\partial V/\partial C_k$, though nearly always monotonic, are seldom linear over more than 10% of the full range of $\nu_{osc.}$ and V respectively. (They are usually both constant over some interval of about 8–10%, however.) Accordingly, it is possible, simply by consulting easily made calibration charts of $\nu_{osc.}(C_k, C_t)$ and $V(C_k, V_t)$, to set the controls for the degree and type of interaction (none, slight and linear, drastic and nonlinear, etc.) that may be desirable in the given application.

Another application of the intercontrol interaction involves the stabilization of $H_0$ with respect to $\nu_{osc.}$, i.e., "locking" $H_0$ to $\nu_{osc.}$, by producing a voltage proportional to the oscillator plate current (and therefore to $\nu_{osc.}$, if there is no change in time of the nuclear resonant absorption) and amplifying this voltage to control the current in the electromagnet producing $H_0$ or in a shim coil producing a small static magnetic field superimposed on $H_0$. Such stabilization would be valuable in the very precise measurement (for pointwise plotting) of absorption amplitudes at discrete values of $\nu_{osc.}$ or $\nu_{res}$.

An embodiment of the present invention as represented in general form in FIGURE 4 is given in specific form in FIGURE 5. The sample coil 20 is designed for operation with cylindrical samples 13.05 mm. in outside diameter, at frequencies in the approximate range 16–20 mc./sec.; it has an inductance of 2.20 $\mu$h. and a Q at 20 mc./sec. of 350. (As mentioned previously, high Q and high L contribute greatly to the success of a circuit operating in the decaying mode.) The coil 20 is coupled to the rest of the circuit by a sturdily built low-distributed-capacitance rigid coaxial line 21 with an inductance of about 0.65 $\mu$h. and a Q at 20 mc./sec. of about 380. $C_t$ here consists of a capacitance 22 (the tuning control) variable from 10 pf. to 140 pf., and fixed padder capacitance 23 of 30 pf. This embodiment of the invention employs grid-leak detection; the grid-leak resistor 24 has a resistance of 65,000 ohms, and the coupling capacitance 25 is 75 pf. $C_k$ consists of variable capacitance 26 (4–75 pf.) (the regeneration control) and padding capacitances 27 (15 pf.) and 28 (100 pf.). (As is customary and necessary in such circuits, all parts are generally overrated; elaborate precautions are taken to dissipate harmlessly all heat produced; critical components are temperature-compensated; all components are painstakingly selected for low noise and constant characteristics; all wiring is short, straight, rigid, and (in some cases) silver-plated; the entire assembly is surrounded by a heavy, airtight shield, and is shock-mounted; and numerous other precautions are taken to assure low drift rate and relative freedom from microphonic, electrical-pickup, and thermal noise.) The tube 29 is of type 5654/6AK5-W/6096, and is selected for the degree of gassiness indicated by a transconductance of 6000 $\mu$mho with an anode potential of 180 v. Filament potential of 6.00 v. D.C. is filtered for radio-frequency signals by choke 30 (100 $\mu$h.) and bypass capacitors 31a, 31b (each 1000 pf.). The anode potential is 300 v. D.C. (voltage-regulated to better than 0.002% indefinitely, with ripple and noise less than 100 $\mu$v.), and the plate limiting resistance 50 is about 55,000 ohms. The screen grid of the tube 29 is connected to the plate as shown and is by-passed to ground for radio-frequency signals by the capacitance 34 (1000 pf.), and the direct-current path for the cathode is provided by radio-frequency choke 35 (100 $\mu$h.).

Figure 10A:
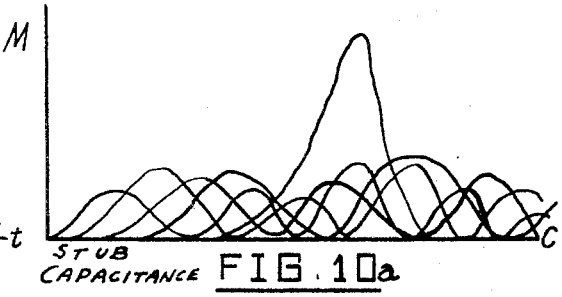
FIGURES 10a and 10b are graphical diagrams illustrating the application of certain other refinements in the embodiment of FIGURES 4 and 5.

The remaining components, namely, resistance 36 (47 ohms) and untuned stubs 37, 38, 39, and 40, will now be described. These four stubs are not inductive couplers, nor are they resonant at the working frequency, nor are they inductive loads. They are pieces of wire (from 2 to 20 mm. long) that act as trimmer capacitors to permit the extraordinarily minute and sensitive adjustment of the small capacitances drawn in FIGURE 5 with dotted lines. In order that it may be understood qualitatively why adjustment of these capacitances to within a few ff. (ff.=femtofarad=$10^{-15}$ farad) of certain values is essential to the optimal performance of the circuit, reference will be made in the following discussion to FIGURES 10a and 10b.

The interrelationships between values of the various components of a marginal oscillator are very complex at best; but when one introduces the additional requirement (inconsistent with prior requirements) that the circuit be able to ring for a long time, the situation becomes all but unmanageable. For example, the grid-leak resistance 24 must be large to increase the grid bias (without increasing grid current) in order to increase the effective grid and plate resistances seen by the resonant circuit; to increase the voltage drop (and hence the sensitivity) in grid-leak detection; and to increase the possible tank inductance for long ringing (since a tank loaded by a relatively low resistance must have high capacitance and low inductance to have a high effective Q, and high inductance is essential to prolonged ringing). The same resistance must be small, however, to obtain a short enough time constant with the capacitance 25 to pass rapid variations in the Q of (absorptions from) the coil 20, and because the rapidity of oscillation decay is governed by $e^{-Rt/2L}$ and resistance 24 contributes to R. There are many other contradictory requirements on the value of the resistance 24. Likewise, the capacitance 25 must be large for low radio-frequency reactance, to permit a higher tank inductance, and to increase $C_{in}$ for better stability; but it must be small to obtain a short time constant with the resistance 24, for improved harmonic attenuation, and to provide the large capacitance required for high stability. Again, the capacitance 22 must be large for improved stability and to obtain a suitably high resonant frequency with the relatively low values of inductance of the coil 20 dictated by coil size and Q, but it must also be small for low current in coil 20, to permit the higher inductance required for longer ringing, and to minimize harmonic accentuation.

Figure 10B:
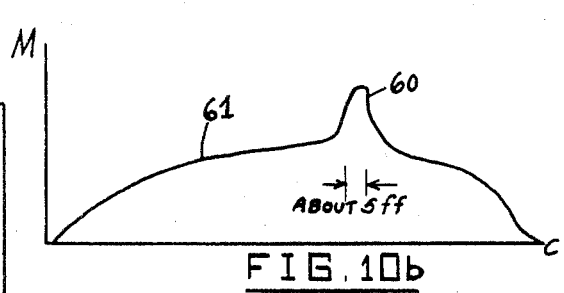

These and many other mutually incompatible requirements associated with every component in the circuit present an optimization problem of enormous complexity. If one plots the value of a figure of merit M for the entire system against the capacitance of one of the capacitors represented in FIGURE 5 by dotted lines, one obtains a series of optimization curves of a form represented by the idealization of FIGURE 10a, wherein each curve represents the consideration of the given capacitor in conjunction with a different component, or in a different network, or for a different characteristic; in short, as playing just one of its many roles in the circuit. The resultant of adding all these optimization curves is represented by the idealization in FIGURE 10b; at least one very narrow spike 60 superimposed on a broad curve 61 of acceptable (but not optimal) values indicates the critical range within which the capacitance must fall if the performance of the circuit is to be limited only by inherent and irremediable defects. It is found in practice that the spike (which may be single or multiple) indicated in FIGURE 10b is frequently only a few ff. wide, although the band of acceptable values is several pf. wide; hence the use of stubs (which are carefully bent into the proper positions) rather than conventional trimmer capacitors to adjust the critical capacitances.

It is clear that the introduction of stubs is undesirable because they make excellent quarter-wave resonators for microwave parasitics (suppressed by the resistance 36 and by certain mechanical operations on the stub 40). One could just as well employ very small trimmer capacitors of special types, capable of adjustments sufficiently fine for this application; a pair of plates between which moves a solid dielectric of adjustable position, or an evacuated plate-containing chamber into which gas at a desired pressure is admitted, or a very small piston trimmer capacitor, may be suitable. Many other modifications within the spirit of this invention would clearly be possible; the novelty of this portion of the invention lies in the introduction of circuit refinements for so minutely adjusting certain capacitances as to optimize performance of the new types of circuitry described elsewhere herein.

In order to demonstrate the utility of the embodiment of the invention shown in FIGURE 5, several measured performance specifications for a circuit of this type will now be listed.

*Frequency range:* 16–20 mc./sec., continuously tunable (to within no more than 0.5 c./sec. of a frequency given digitally); ranges from 2 to about 45 mc./sec. are available.

*Harmonic distortion:* less than 1%.

*Frequency stability:* less than 1.0 (worst case) or 0.3 (normally) c./sec. excursion over 3 min. free-running; arbitrary stability is obtainable by crystal excitation.

*Sensitivity:* sufficient to detect, with signal/noise of 2 for integration over four 10 $\mu$sec. passes through the resonance, the $^7$Li resonance from $2 \times 10^{15}$ $^7$Li nuclei (in steady-state operation) or from $1.5 \times 10^{14}$ $^7$Li nuclei (in decaying-mode operation) in LiF aqueous solution at room temperature. (The sensitivity in the decaying mode corresponds to the ability to detect under the said conditions an absorption of $6.35 \times 10^{-11}$ erg, which is equivalent to 38 e.v. and to $5 \times 10^{-16}$ watt. It also corresponds to a system noise bandwidth at 300° K. of 120 kc./sec., and, for a 20 mc./sec. noise bandwidth, to an effective system temperature of 1.8° K.)

*Maximum $H_1$:* more than 20 mG.

*Minimum $H_1$:* about 2 $\mu$G. in steady-state operation and less than 50 nG. (nanogauss) in decaying-mode operation.

$H_1$ variable (with infinite resolution) between these two limits in less than 1 sec., with reproducibility in 1 in $10^4$ or better.

*Ultimate resolution:* probably better than 1 in $10^9$; at least 5 in $10^9$.

*Ambient-temperature range:* at least 0–50° C.; unaffected by changes within the range 10–36° C.

Among the many modifications and alternative embodiments that would readily occur to one skilled in the art but which are within the spirit of the present invention are the substitution of solid-state components for the vacuum tube or tubes employed in the above-described embodiments (and possibly the use of a solid-state device with a long decay characteristic instead of the gassy tube); the addition of feedback loops to stabilize the oscillation in frequency and in amplitude; provision for cooling the circuitry to low temperatures; and the addition of a limiter (as described by Robinson) so modified for decaying-mode oscillation that the decay occurs within the limiter tube or tubes, and the radio-frequency oscillator follows the limiter output.

Further embodiments of the present invention involve the combination of a device (according to FIGURES 2, 4, and 5, for example) that measures nuclear resonance absorptions during the decay of the radio-frequency oscillation with means for recording these absorptions. The traditional phase-detection techniques cannot be applied here, since the decay is a brief and "one-shot" event; absorptions may be recorded on an oscilloscope, for example, by displaying the amplified and detected oscillator output on the vertical channel and the $H_0$-modulation waveform on the horizontal channel, as shown in FIGURE 14, or by using an oscilloscope with delayed sweep, as shown in FIGURE 14a, wherein sweep unit A is delayed by a delay circuit 96 driven by sweep unit B, which is triggered internally, by the incoming signal (which is applied directly to the vertical deflection plates), or by some other signal, and wherein the output of sweep unit A is applied to the horizontal deflection plates. (Sweep unit B may of course be triggered by the $H_0$-modulation signal for improved stability.) The speed of sweep unit A may be adjusted by conventional means to provide the desired magnification of the portion of the signal selected by the adjustment of the sweep unit B and of the delay circuit 96; this is the usual technique for using the delayed-sweep feature of commercial oscilloscopes. An oscilloscope 97 may be employed in conjunction with a motion-picture or an open-shutter camera 98, or a storage oscilloscope or time-averaging computer may be utilized. Many means exist for recording the oscillator output continuously or in sampling intervals long as compared to the signal duration.

Alternatively, one may use some intermittent recording means that records in a sampling interval of the order of, or shorter than, the signal duration. A simple oscilloscope camera 98 may be employed, as one example. There are many possible means of triggering such recording means, i.e., means of assuring that the recording interval will coincide with the interval in which the signal appears. The recording means may be triggered either manually, or automatically by a shutter actuator 99, as shown, for example, in FIGURE 14b; the observation of monitoring devices, such as a meter monitoring oscillator anode current, an oscilloscope examining the radio-frequency oscillator voltage through a high-impedance probe, another oscilloscope and a pair of earphones monitoring the audio-frequency oscillator output, etc., enables a practiced operator to time a manually applied recording trigger properly.

Figure 11:
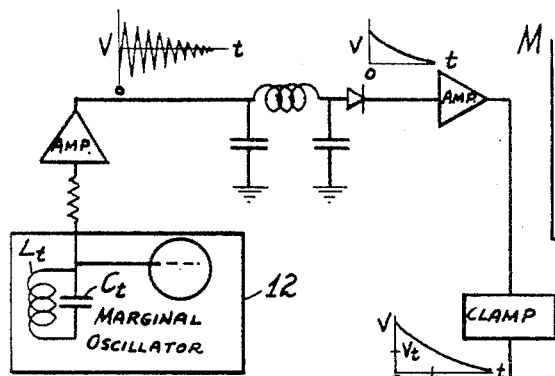
FIGURES 11 to 13 are block diagrams of various embodiments of the present invention employed in conjunction with recording means.
Figure 12:
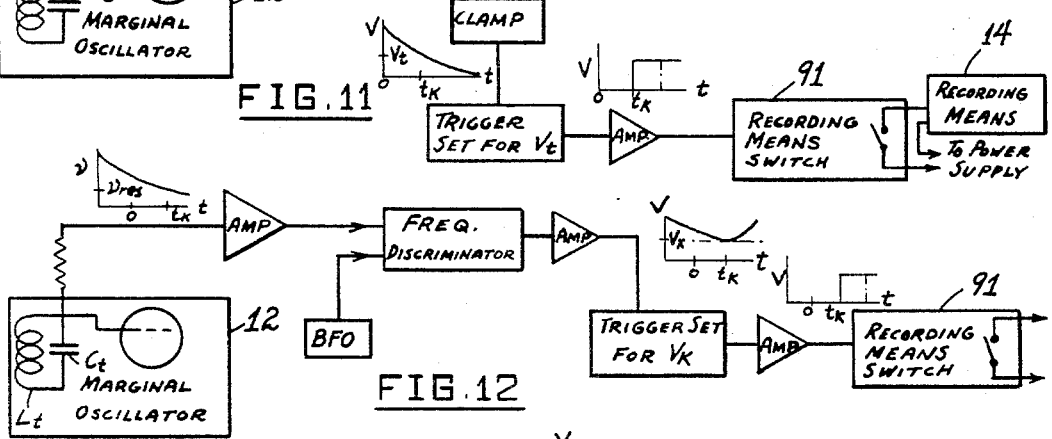
Figure 13:
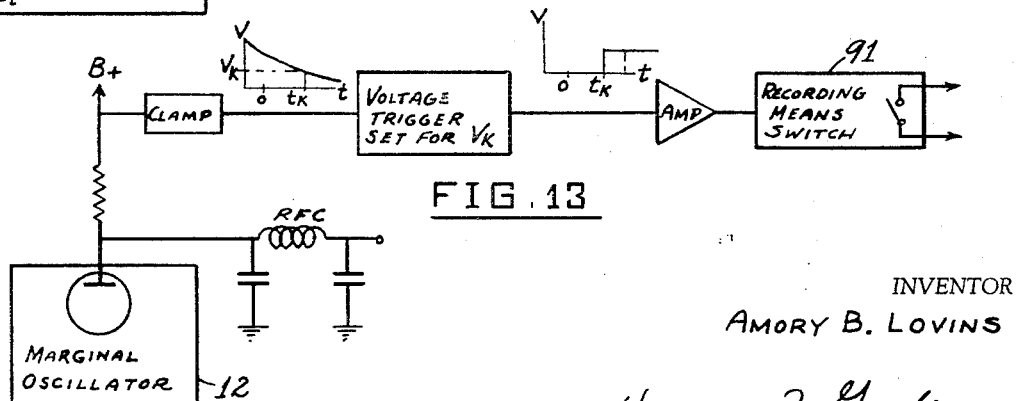

Other means of triggering such recording means are represented in FIGURES 11, 12, and 13. FIGURE 11 shows an arrangement whereby the change in oscillator tuned-circuit voltage during the decay triggers the recorder 14 by actuating a switch 91 when the radio-frequency voltage V has fallen to a certain value $V_t$. (The recorder-triggering signal could of course be used also to trigger an $H_0$-modulation pulse or any of several other things.) FIGURE 12 shows an arrangement whereby the recorder is triggered by a pulse of voltage $V_k$ derived from the corresponding change in oscillator frequency (or the change resulting from deliberate $\nu_{osc.}$-modulation, if any). FIGURE 13 shows an arrangement whereby the change in oscillator anode current resulting from the decay triggers the recorder when the decay has progressed to the proper stage, giving the triggering pulse at time $t_k$ to actuate the recording means. The details of these and many other possible embodiments can be easily supplied by one skilled in the art. Some of the many other possible arrangements comprise the triggering of the recording means by the absorption signal itself, or by the pulse or wave (if any) used for $\nu_{osc.}$- or $\nu_{res.}$-modulation.

While certain specific embodiments of methods and means for the observation of nuclear magnetic resonance absorptions may have been disclosed in the foregoing description, it will be understood that various modifications within the spirit of the invention may occur to those skilled in the art. Therefore it is intended that no limitations be placed on the invention except as defined by the scope of the appended claims.

In particular, it is intended that the method and means described may be employed for the observation of nuclear resonance absorptions not only in the presence of an applied magnetic field $H_0$, but also in the absence of such a field, i.e., in so-called "zero-field" or "pure quadrupole resonance" spectrometry. In this type of spectrometry, the nuclear electric quadrupole moments are polarized by internal electric field gradients in the sample lattice (just as, in conventional nuclear magnetic resonance, nuclear magnetic dipole moments are polarized by $H_0$), and transitions are excited by radio-frequency photons. It is further intended that the method and means herein described may also be employed for the observation of electron resonances—i.e., of transitions between electronic spin states—of real susceptibilities, of magnetoresistances, and the like. In short, no portion of the foregoing description is to be interpreted as a restriction of the application of the invention to nuclear resonance spectrometry.

What is claimed is:

1. A method of detecting nuclear magnetic resonant absorptions in a sample, comprising placing the sample in a unidirectional first magnetic field, irradiating the sample with a high-frequency second magnetic field normal to said first magnetic field, causing said second magnetic field to decay with a time constant of at least $10^{-3}$ seconds until the intensity of said second magnetic field is low enough to cause nuclear magnetic resonant absorption in said sample without causing saturation, equalizing the frequency of said second magnetic field and the nuclear resonant frequency during the decay of said second magnetic field, and detecting the nuclear resonant absorption of said sample.

2. The method of claim 1, and wherein equalization of the last-named frequencies is by varying the frequency of the second magnetic field during its decay.

3. The method of claim 1, and wherein equalization of the last-named frequencies is by varying the intensity of the first magnetic field during the decay of the second magnetic field.

4. The method of claim 1, and wherein equalization of the last-named frequencies is periodically obtained by modulating the intensity of the first magnetic field at an audio frequency during the decay of the second magnetic field.

5. The method of claim 1, and wherein equalization of the last-named frequencies is obtained by varying both the frequency of the second magnetic field and the intensity of the first magnetic field during the decay of the second magnetic field.

6. An apparatus for detecting nuclear magnetic resonant absorptions in a sample, comprising means to generate a unidirectional first magnetic field, sample-supporting means in said first magnetic field, inductor means oriented to irradiate said sample-supporting means with a second magnetic field normal to said first magnetic field, means to energize said inductor means with an under-damped radio-frequency oscillation with a time constant of at least $10^{-3}$ seconds, whereby to excite nuclear resonant absorptions in a sample disposed on said sample-supporting means, and signal detection means operatively connected to said energizing means, whereby to produce electrical signals responsive to nuclear resonant absorptions from said energizing means.

7. The apparatus of claim 6, and wherein said energizing means comprises a tank circuit including a tuning capacitor and said inductor means, the tank circuit having effective Q of at least $10^4$, an independent oscillator, circuit means connecting the output of the oscillator to said tank circuit, and means to at times open said circuit means.

8. The apparatus of claim 6, and wherein said energizing means comprises a marginal oscillator of the autodyne type having a tank circuit including a tuning capacitor and said inductor means, and means providing said oscillator with a relatively prolonged decay characteristic.

9. The apparatus of claim 8, and wherein said oscillator comprises a gassy vacuum tube.

10. The apparatus of claim 6, wherein said energizing means includes a tank circuit wherein the inductor means is the tank coil.

11. The apparatus of claim 6, wherein said energizing means includes a tank circuit, and means magnetically coupling said inductor means to the tank coil of the tank circuit.

12. The apparatus of claim 6, and means to modulate said first-named means, whereby to correspondingly modulate said first magnetic field, whereby to cause said nuclear resonant absorptions to occur or not occur according as the frequency of said decaying radio-frequency magnetic irradiation is or is not equal to the nuclear resonant frequency determined by said first magnetic field.

13. The apparatus of claim 8, and wherein said oscillator comprises a space discharge device having an emitting electrode, a collecting electrode and a control electrode, with the tank circuit connected across the collecting electrode and the control electrode, with a variable load capacitance connected between the collecting electrode and the emitting electrode, and with feedback capacitance means between the emitting electrode and the control electrode.

14. The apparatus of claim 13, and wherein said space discharge device is provided with an electronically regulated power supply including a gas-filled regulator tube to regulate the supply voltage applied to the collecting electrode, a lamp mounted in proximity to said regulator tube, and means to adjust the current through said lamp, whereby to change the intensity of illumination incident on said regulator tube, whereby to change the collecting electrode supply voltage.

15. The apparatus of claim 13, and wherein said space discharge device is a vacuum tube containing sufficient gas to give it a transconductance substantially greater than that of an evacuated tube.

16. The apparatus of claim 13, and wherein said feedback means includes at least one adjustable capacitance element connected to the control electrode.

17. The apparatus of claim 13, and respective adjustable capacitive elements connected to the control electrode and collecting electrode and being in capacitive relation to each other and to the emitting electrode.

18. The apparatus of claim 12, and wherein said signal detection means comprises an oscilloscope having vertical and horizontal deflection means, the energizing means being connected to one of said deflection means, and the means to modulate the first magnetic field being connected to the other deflection means.

19. The apparatus of claim 6, and wherein said signal detection means comprises an oscilloscope having vertical and horizontal deflection means, said energizing means being connected to one of said deflection means, a sweep unit connected to the other deflection means, and a delay device triggering said sweep unit a predetermined time after the output voltage of said energizing means reaches a predetermined value, whereby to display said electrical signals from said energizing means during the time interval in which nuclear resonant absorptions from the sample occur.

20. The apparatus of claim 12, and wherein said signal detection means comprises an oscilloscope having vertical and horizontal deflection means, the energizing means being connected to one of said deflection means, a sweep unit connected to the other deflection means, a delay device arranged to trigger said sweep unit, and means to trigger said delay device by electrical signals from the modulation means for said first magnetic field, whereby to display the signal from said energizing means during the time interval in which nuclear resonant absorptions from the sample occur.

21. The apparatus of claim 18, and a camera arranged to photograph the oscilloscope, said camera being provided with an electrical shutter actuator, and means operatively connecting said actuator to said one of the deflection means so as to be triggered during the interval in which a nuclear resonance signal appears on the oscilloscope screen.

22. The apparatus of claim 6, and means to actuate said signal detection means responsive to the decay of the radio-frequency output voltage of the energizing means to a predetermined value, whereby to initiate display of said electrical signals.

23. The apparatus of claim 6, and wherein the output frequency of the energizing means changes during the decay of the underdamped oscillation, and means to actuate said signal detection means responsive to a predetermined change in the output frequency of said energizing means, whereby to initiate display of said electrical signals.

24. The apparatus of claim 6, and wherein the output current of the energizing means changes during the decay of the underdamped oscillation, and means to actuate said signal detection means responsive to a predetermined change in the output current of said energizing means resulting from the decay of oscillation, whereby to initiate display of said electrical signals.

References Cited

UNITED STATES PATENTS

| 2,705,790 | 4/1955 | Hahn | 324—0.5 |
| 2,718,629 | 9/1955 | Anderson | 324—0.5 |
| 2,887,673 | 5/1959 | Hahn | 324—0.5 |
| 3,075,156 | 1/1963 | Anderson | 324—0.5 |
| 3,083,335 | 3/1963 | Schuster | 324—0.5 |

OTHER REFERENCES

Review of Scientific Instruments, vol. 29, No. 8, August, 1958, pp. 688–691. (Meiboom).

Review of Scientific Instruments, vol. 28, No. 10, October, 1957, pp. 780–789. (Schwartz).

Electronics, June, 1954, pp. 134–137. (Malling).

RUDOLF W. ROLINEC, *Primary Examiner.*

M. J. LYNCH, *Assistant Examiner.*

UNITED STATES PATENT OFFICE
CERTIFICATE OF CORRECTION

Patent No. 3,430,128　　　　　　　　　　　　February 25, 1969

Amory B. Lovins

It is certified that error appears in the above identified patent and that said Letters Patent are hereby corrected as shown below:

Column 1, line 23, "μsec" should read -- msec --; line 51, "m=+1/2-1/2" should read -- m=+1/2, -1/2 --; line 62, "$jhH_0m$" should read -- $j\hbar H_0 m$ --. Column 2, line 3, "$H_0j/2\pi = H_0j$" should read -- $H_0 j/2\pi = H_0 \bar{j}$ --. Column 3, line 27, "$2 \times 10^{-15}$" should read -- $2 \times 10^{15}$ --. Column 4, line 58, "contact" should read -- constant --. Column 8, lines 1 and 4, "100 μsec", each occurrence should read -- 100 msec --. Column 11, line 23, "10 μsec" should read -- 10 msec --; line 39, "in 1 in $10^4$" should read -- of 1 in $10^4$ --. Column 12, line 75, "$H_0$" should read -- $\underset{\sim}{H_0}$ --.

Signed and sealed this 7th day of April 1970.

(SEAL)

Attest:

Edward M. Fletcher, Jr.

Attesting Officer

WILLIAM E. SCHUYLER, JR.

Commissioner of Patents